US007251011B2

(12) United States Patent
Walker et al.

(10) Patent No.: US 7,251,011 B2
(45) Date of Patent: *Jul. 31, 2007

(54) SUBWAY MOVIE/ENTERTAINMENT MEDIUM

(75) Inventors: Robert Walker, Winnipeg (CA); Bradley Caruk, Winnipeg (CA)

(73) Assignee: Sidetrack Technologies Inc., Winnipeg (CA)

( * ) Notice: Subject to any disclaimer, the term of this patent is extended or adjusted under 35 U.S.C. 154(b) by 190 days.

This patent is subject to a terminal disclaimer.

(21) Appl. No.: 11/032,215

(22) Filed: Jan. 11, 2005

(65) Prior Publication Data

US 2005/0174539 A1 Aug. 11, 2005

Related U.S. Application Data

(63) Continuation-in-part of application No. 10/332,100, filed as application No. PCT/CA01/00999 on Jul. 5, 2001, now Pat. No. 6,870,596, which is a continuation-in-part of application No. 09/628,333, filed on Jul. 28, 2000, now abandoned.

(51) Int. Cl.
*G03B 25/00* (2006.01)

(52) U.S. Cl. ...................................................... 352/100

(58) Field of Classification Search .................. 352/98, 352/100; 40/453, 463
See application file for complete search history.

(56) References Cited

U.S. PATENT DOCUMENTS 2,299,731 A 10/1942 Arendt
2,319,287 A 5/1943 Arendt
3,653,753 A 4/1972 Mitchell
3,694,062 A 9/1972 Koenig
3,704,064 A 11/1972 Sollogoub et al.
3,951,529 A 4/1976 Gandia (Continued)

FOREIGN PATENT DOCUMENTS

CA 2 314 281 7/2000

(Continued)

OTHER PUBLICATIONS

Costello, Paula "Subway riders may get tunnel vision"(online); Media in Canada, Aug. 24, 2004 (re4trieved Feb. 22, 2006) Rettrieved from applicants website http://www.sidetrack.ca/med web/press html.

*Primary Examiner*—Rodney Fuller
(74) *Attorney, Agent, or Firm*—Ryan W. Dupuis; Michael R. Williams; Adrian D. Battison

(57) ABSTRACT

A system displays a collection of stationary images as a motion picture to passengers traveling in a vehicle along a pathway. In a first embodiment, the vehicle moves at a known speed and known distance from the images. The images, placed in parallel along the walls of the pathway of the vehicle, are adapted in number, size, and spacing for a vehicle traveling at the known speed and at the known distance from images on one or both sides of the vehicle such as to maintain an approximately constant viewing rate and perceived size of the images. In an alternate configuration, a speed sensor monitors speed of the vehicle to determine the appropriate cycling rate of the images. In a preferred embodiment, the images themselves are cycled intermittently with a blank image while remaining steadily illuminated by an illumination system.

20 Claims, 6 Drawing Sheets

U.S. PATENT DOCUMENTS

| | | | | |
|---|---|---|---|---|
| 4,179,198 | A | 12/1979 | Brachet et al. | |
| 4,383,742 | A | 5/1983 | Brachet et al. | |
| 5,108,171 | A | 4/1992 | Spaulding | |
| 6,016,183 | A | 1/2000 | Yamanmoto | |
| 6,353,468 | B1 | 3/2002 | Howard et al. | |
| 6,466,182 | B1 * | 10/2002 | Shigetomi et al. | 345/1.1 |
| 6,466,183 | B1 * | 10/2002 | Yamamoto et al. | 345/1.1 |
| 6,564,486 | B1 | 5/2003 | Spodek et al. | |
| 6,870,596 | B2 * | 3/2005 | Walker et al. | 352/100 |

FOREIGN PATENT DOCUMENTS

| | | |
|---|---|---|
| CA | 2314281 | 7/2000 |
| CA | 2414262 | 7/2001 |
| GB | 2 241 813 A | 7/1990 |

* cited by examiner

SUBWAY MOVIE/ENTERTAINMENT MEDIUM

CROSS REFERENCE TO RELATED APPLICATIONS

This application is a continuation-in-part of application Ser. No. 10/332,100, filed Jan. 3, 2003, now U.S. Pat. No. 6,870,596, which is a 371 of PCT/CA01/00999, filed Jul. 5, 2001, which is a continuation-in-part of application Ser. No. 09/628,333, filed Jul. 28, 2000, now abandoned.

FIELD OF THE INVENTION

This invention relates to an apparatus for displaying a collection of stationary images as a motion picture to passengers in a vehicle, for example a train, travelling along a pathway in the vicinity of the images.

DESCRIPTION OF THE PRIOR ART

It is known to provide a motion picture system for viewing from a vehicle traveling along a fixed path. A known form of such a system comprises a plurality of static images, image mounts mounting the images along one side of the fixed path and an illumination system for illuminating each of the images intermittently. The proposed uses of these systems include commercial advertising, entertainment, and information provision. A variety of illumination methodologies, triggering mechanisms, and display mountings have been proposed.

The systems disclosed in U.S. Pat. Nos. 4,383,742 and 4,179,198 use electromagnetic triggers to sense the velocity of the moving vehicle and to synchronize the intermittent illumination of the images according to the vehicle speed and the image dimensions. Thus, the frequency of the motion picture varies with the speed of the train. Furthermore, the necessary synchronizing mechanism is quite complicated and therefore expensive. In the second patent, light flash emitting devices are installed on the vehicle at regular intervals. The traveling light source results in a blurring of the image, particularly at the edges. Installation requires modifications to the vehicle, which may prove expensive and undesirable.

U.S. Pat. No. 5,108,171, discloses, in one embodiment, a trigger mechanism responsive to a light signal from each window of the vehicle. In another embodiment, a reflector is associated with each window to reflect light from stationary light sources. This latter arrangement is another form of traveling light source with consequent image blurring. This system requires modifications to and regular maintenance of the vehicle, which is expensive and undesirable.

U.S. Pat. No. 6,016,183 discloses the use of individual sets of screens and stroboscopic liquid crystal projectors for the display of images. Image signals are sent to the liquid crystal projectors from an image source such a digital video player. This combination is expensive.

U.S. Pat. No. 3,951,529 discloses a system using a rear stroboscopic backlight for each image to illuminate the images, but provides scant guidance on the size and placement of the images. Thus to an observer in the vehicle there is the undesirable possibility that only a partial view of an image is perceived through the closest vehicular window.

Additional prior art which fail to provide an effective motion picture appearance include GB 2 241 813 A to Helcke and U.S. Pat. Nos. 6,564,486 to Spodek et al, 3,694,062 to Koenig and 6,343,468 to Howard et al.

All of the patents referred to above are incorporated herein by reference.

One common problem with all of these patented inventions is the possible of loss of synchronicity in illumination. In this case, the observer sees flashing black images, which detracts from the esthetic appeal of the motion picture. Another problem is the failure to account for a change in the perceived size of the image if the distance between the vehicle and the wall changes. Therefore, for a passenger travelling in a vehicle through different areas where such a system is installed, there may be a great variation in perceived image size corresponding to differing cross-sectional width of the relevant pathways. The prior art displays are further limited in their ability to vary the images being displayed due to costly and labor intensive manual replacement of the images being required.

SUMMARY OF THE INVENTION

According to one aspect of the present invention there is provided a moving picture system for viewing from a vehicle traveling along a fixed path at a substantially constant speed V, the system comprising:

a plurality of display panels, each for displaying a static image on a viewable surface of the panel;

image mounts mounting the display panels along one side of the fixed path;

a static illumination system for only illuminating each display panel for viewing the static images;

an image cycling system for cycling the viewability of the static images at a fixed frequency viewing rate of images R; and a single trigger responsive to the approach of the vehicle to initiate the image cycling system to cause the viewability of all of the images to be cycled simultaneously;

wherein each image has a width $W_p$ and is spaced from the adjacent images by a spacing $W_i$ and the dimensions $W_p$ and $W_i$ are related to the vehicle speed by $$(W_p+W_i) \geqq V/R$$

where R is greater than or equal to 24 images per second.

The images, of minor variation in successive content, give to an observer the illusion of a motion picture when viewability is rapidly cycled. The advantages of the apparatus over the prior art include its moderate cost, the relatively simple construction, installation, and maintenance of the constituent elements, and the improved view offered to passengers in the vehicle. With this system at least twenty four images per second pass a stationary passenger in the moving vehicle regardless of the speed of the vehicle.

According to a second aspect of the present invention there is provided a moving picture system for viewing from a vehicle traveling along a fixed path at a substantially constant speed V, the system comprising:

a plurality of static images;

image mounts mounting the images along one side of the fixed path; and a static illumination system for illuminating each of the images intermittently, characterized in that:

each image has a width $W_p$ and is spaced from the adjacent images by a spacing $W_i$ and the dimensions $W_p$ and $W_i$ are related to the vehicle speed by $$(W_p+W_i) \geqq V/R$$

where R is the viewing rate of the images and is greater than or equal to 24 images per second; and the illumination system includes a single trigger responsive to the approach of the vehicle to cause all of the images to be illuminated simultaneously at a fixed frequency greater than 24 Hz.

According to a third aspect of the present invention there is provided a moving picture system for viewing from a vehicle traveling along a fixed path, the system comprising:

a plurality of display panels, each having a viewable surface which is cyclable between an active state in which a static image is displayed and an inactive state in which a blank image is displayed, the viewable surface being cyclable between the first and second states at a fixed frequency viewing rate which is greater than 24 cycles per second and which is dependent upon speed of the vehicle;

image mounts mounting the display panels along one side of the fixed path;

an illumination system for providing illumination to the display panels for viewing the static images; and a single trigger responsive to the approach of the vehicle to cause the viewable surfaces of all of the display panels to be simultaneously cycled between their respective first and second states.

When cycling the images themselves, cycling is similarly governed by:

$$(W_p+W_i)\geqq V/R$$

where R is the fixed frequency viewing rate and is greater than or equal to 24 images per second.

A speed sensing device may be provided fixed in relation to the fixed path of the vehicle for measuring speed of the vehicle and for using this speed to calculate the viewing rate of the images. In the preferred embodiment, the speed sensing device comprises spaced apart interruptable IR beams spanning across the path of the vehicle to determine speed using elapsed time between interruption of thee beams. The beams may also serve as the trigger to initiate cycling of the images.

The display panels may be divided into consecutive banks, each bank comprising a plurality of the display panels, in which the viewability of one bank can be controlled independently of the remaining banks by the image cycling system. In this arrangement, the image cycling system can control viewability of the display panels in a stepped manner by sequentially activating or sequentially deactivating the banks.

In one advantageous embodiment, the viewable surface comprises a layer of charged particles supported on a control layer in which the charged particles vary in orientation depending upon various electrical charges applied to the control layer to cycle the image between the static image and the blank image. The set of images being displayed can thus be instantly varied to a different set of displayed images electronically or at a preprogrammed time according to the controller programming.

In one embodiment, the image cycling system cycles the illumination system, dependent upon sensed vehicle speed, regardless of the configuration of the display panels.

Alternatively, the image cycling system cycles the viewable surface of each panel simultaneously, dependent upon sense vehicle speed, between a first state in which the static image is displayed and a second state in which a blank image is displayed. In this instance it is desirable for the illumination system to provide steady illumination to the display panels, for example using light emitting diodes.

The viewable surface may comprise a non light emitting surface in which the blank image displayed by each panel in the inactive state is darker than the respective static image displayed in the active state.

Each display panel may be cyclable between the inactive state and a selected one of plural different active states, each corresponding to a different static image being displayed as programmed by the controller.

In embodiments where the distance from the vehicle to an adjacent wall carrying the images varies along the path, the ratios of the image width and height to the vehicle to image spacing are maintained constant, either by varying the positioning of the images relative to the wall or varying the image size. This maintains the perceived size of the images fairly constant.

BRIEF DESCRIPTION OF THE DRAWINGS

Embodiments of the invention will be described by way of example and with reference to the drawings in which.

DESCRIPTION OF THE PREFERRED EMBODIMENT

Figure 1:
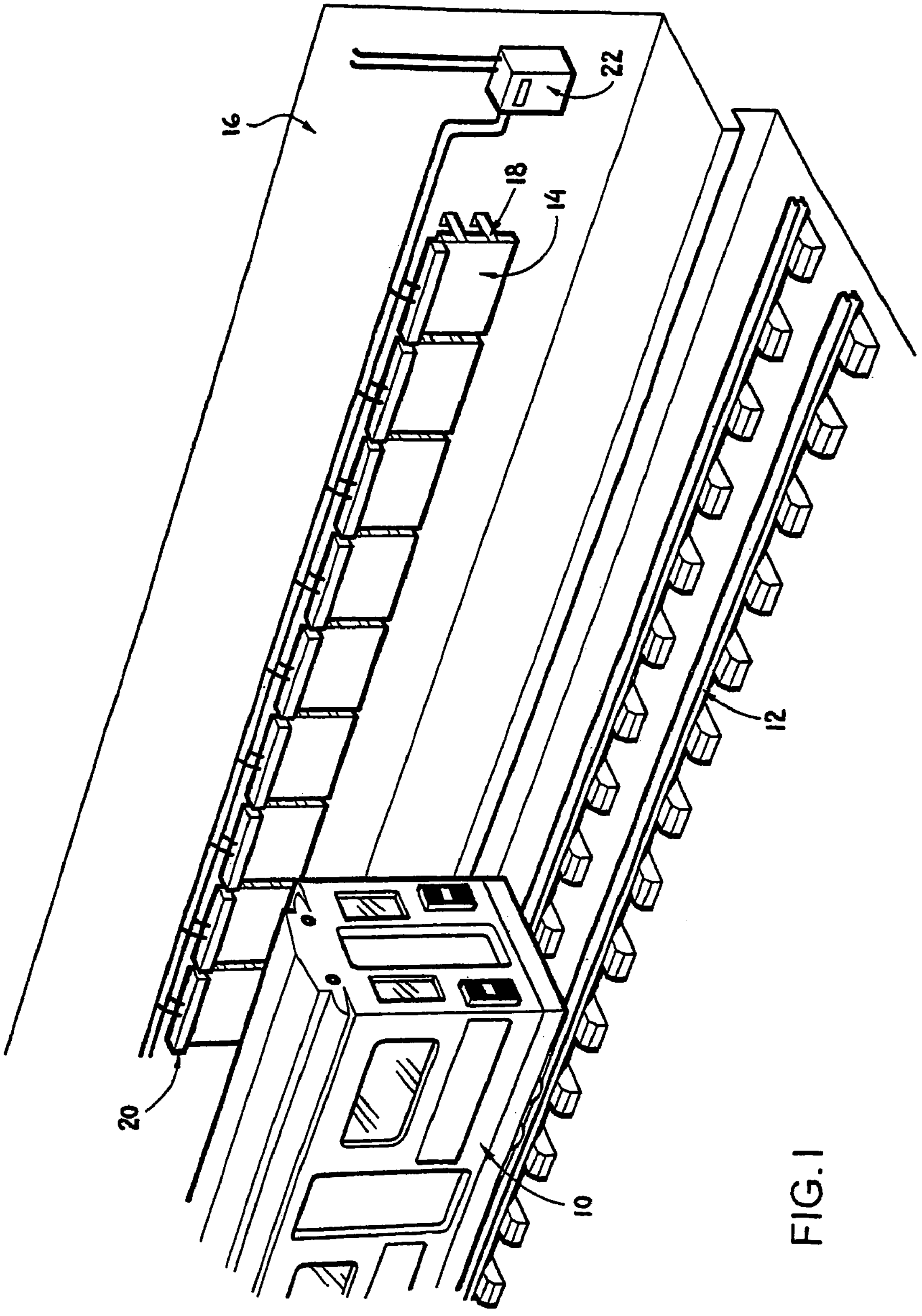
FIG. 1 is a perspective view of an installation of a system according to the present invention.

Referring to the accompanying drawings, there is illustrated a moving picture system for viewing from a vehicle traveling along a fixed path, for example a subway train 10. While various embodiments are described in the following, the common features of each will first be described herein.

A subway train 10 travels along a pathway defined by track 12. Along one side of the vehicle's pathway are placed image panels 14, each of which displays one image. The image covers the whole of the image panel. Typically, solid walls 16 line the sides of the pathway, but this is not required for proper functioning of the invention. Each image panel 14 is mounted on the wall 16 by a panel mount 18. Each image panel 14 is Illuminated by a light 20 directed towards the image on the front face of the panel. The lights and an associated system for cycling viewability of the images are operated by a common controller 22.

Turning now to the first embodiment of FIG. 1, the display panels each illustrate a static image which remains displayed. The lights 20 illuminating each panel comprise stroboscopic lights controlled by the controller 22 to cycle at the desired viewing rate. The lights may comprise light emitting diodes (LED's) or any other type of lighting capable of providing precise control of the illumination.

Figure 5:
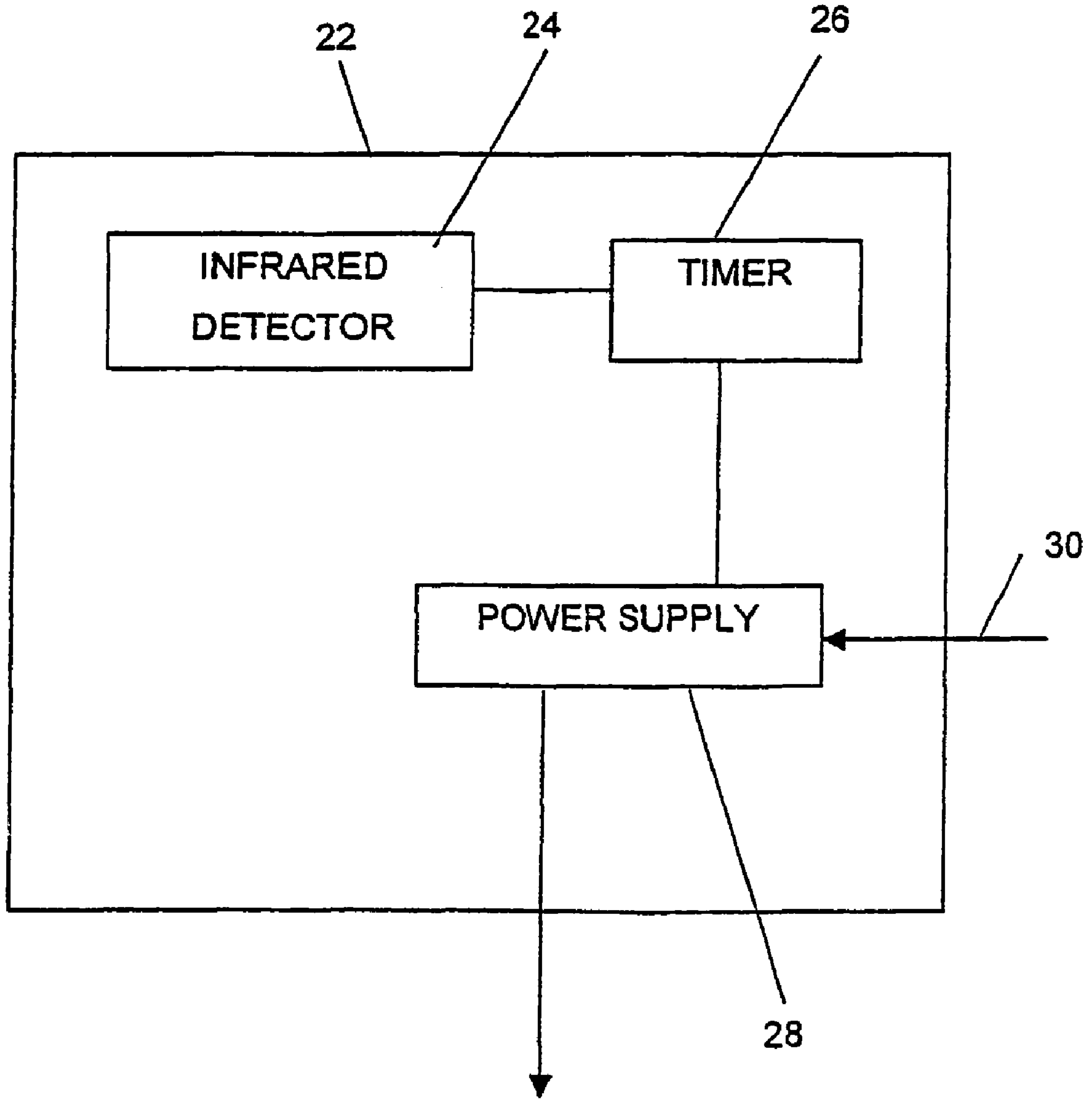
FIG. 5 is a schematic representation of the illumination system.

As illustrated in FIG. 5, the controller 22 includes an infrared (IR) motion detector 24 positioned to detect the approach of the train 10. On detection of the train, the IR detector starts a timer 26, which in turn actuates a strobe power supply 28. The power supply is connected to an AC mains power supply 30 and produces an output wave at mains frequency, either 50 or 60 Hz depending on location. This minimizes the complexity of the controller and eliminates any synchronization of the image illumination with either train speed or window position. After a preset time, the timer 26 counts out and the power supply is turned off. The time of operation is selected to be sufficient to allow passage of the subway train.

It is known that where the frequency at which images of minor variation are flashed to an observer at or in excess of about 24 cycles per second, the perception is that of smooth motion. The human mind fills in the intervening blank spaces to create an illusion of continuous motion. Furthermore, a separation of the still images is necessary. For example, on television, diagonal black bars are scanned at a rate of one-eighth to one-thirtieth per second; and cinematic films frames are separated by a fine black border.

If the frequency falls below this threshold of about 24 cycles per second, the psychological perception of continuous motion is not achieved; instead, any movements are seen as "jerky" and the images flash.

Figure 3:
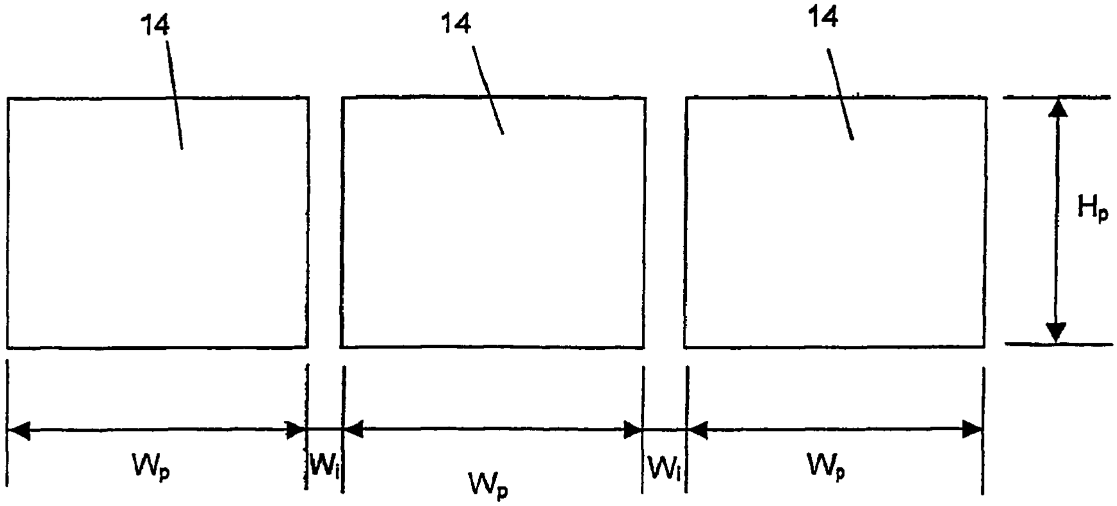
FIG. 3 is a schematic front view of a section of mounted panels.
Figure 4:
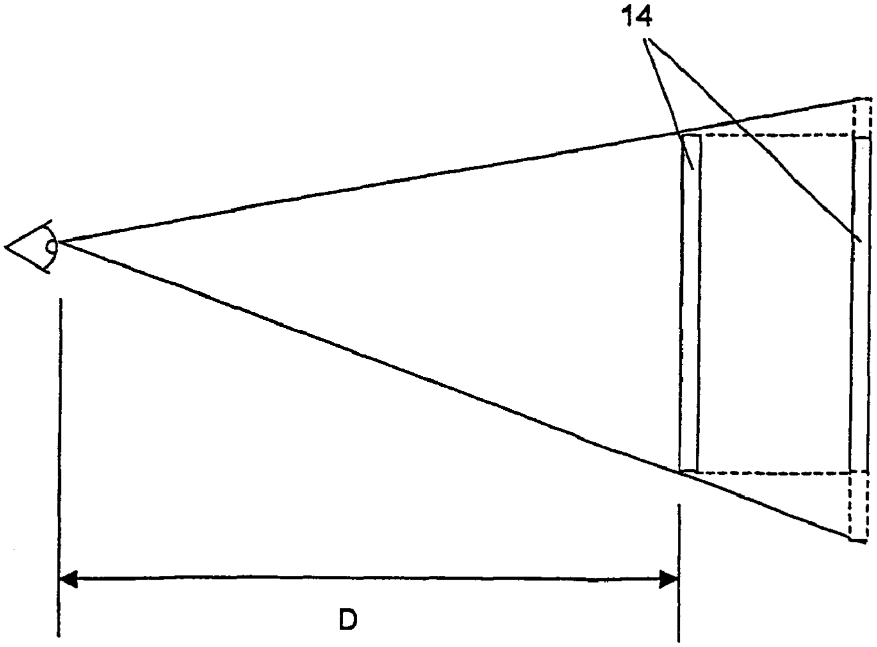
FIG. 4 is a schematic side view illustrating a system compensating for variations in the vehicle to image spacing.

Referring to FIGS. 3 and 4 of the drawings, each panel has a panel width $W_p$ and a height $H_p$. It is spaced from each adjacent panel by a spacing $W_i$. The image is spaced from the side of the train by a distance D. The speed at which a subway vehicle (or any conventional means of mass vehicular transport) travels during cruising speed is generally consistent from day to day. This is to permit detailed scheduling as well as for safety reasons. It is therefore an acceptable assumption, in some embodiments, that the speed of a subway train is relatively constant, consistent, and known in the region where the system is installed. Given that the threshold image viewing rate is about 24 cycles per second, this imposes an upper limit on the width $W_p$ of each image panel plus the spacing $W_i$ associated with the separation between images. The relationship is such that the minimum speed of the vehicle V is the multiplicative product of the panel width plus separating distance, and the continuous motion threshold (about 24):

$$V \leqq (W_p + W_i)R,$$

where R is the viewing rate of the images and is ≧24.

To maintain the largest possible image size, the viewing rate should be kept as close to 24 as possible.

If the speed of the vehicle increases, then the panel size plus separating distance must proportionately increase if the viewing rate by the observer in the vehicle is to remain at about 24 cycles per second. Considerations of aesthetic appeal mandate an increase of the size of each image panel with a concomitant decrease in the separating distance between the image panels. On the other hand, a decrease in the speed of the vehicle requires that the image panel size plus separating distance decrease. In fact, the image panel size actually decreases whereas the separating distance increases, again, for aesthetic reasons. Studies show that a maximum of five centimeters (two inches) is imposed on the separating distance between image panels. This upper limit works also to eliminate the possibility of loss of synchronicity so prevalent in other attempts at creating the same effect. In general, the cruising speed of a vehicle is unlikely to vary by a significant amount, and variations in panel size and interval tend to be minimal.

A desirable characteristic of a motion picture apparatus is to keep constant the dimensions of the image as perceived by the observers. As illustrated in FIG. 4, the size of an image as seen by an observer inside the vehicle is inversely proportional to the perpendicular distance from the observer (in practice the window of a vehicle) to the image panels. If this distance increases, in order to keep the perceived size constant, the absolute size of an image as carried by an image panel must increase proportionally. The ratios of image width $W_p$ and height $H_p$ to the distance from the train to the wall remain constant. The consequent expansion or contraction in image panel size is compensated by a decrease or increase in the separating distance so as to leave unperturbed the viewing rate.

Therefore, the dimension and placement of the image panels are specified as a function of the speed of the travelling vehicle and the distance from the image panels to the train. For example, if the vehicle travels at about 80 kilometers per hour (50 miles per hour), which is equivalent to about 22.22 meters per second (73.35 feet per second), in order to afford a viewing rate of about 24 images per second, the width of each image panel plus the interval spacing is approximately one meter (three feet). Typically, the interval spacing on each size of an image is chosen as one-twelfth the size of the panel plus interval spacing, 8.3 centimeters (3 inches). If the distance to the wall increases by five percent, then the image panel size increases proportionately to 96.2 centimeters meters (2 feet 10.7 inches), and the interval spacing should be set at about 3.8 centimeters (1.3 inches).

Figure 2:
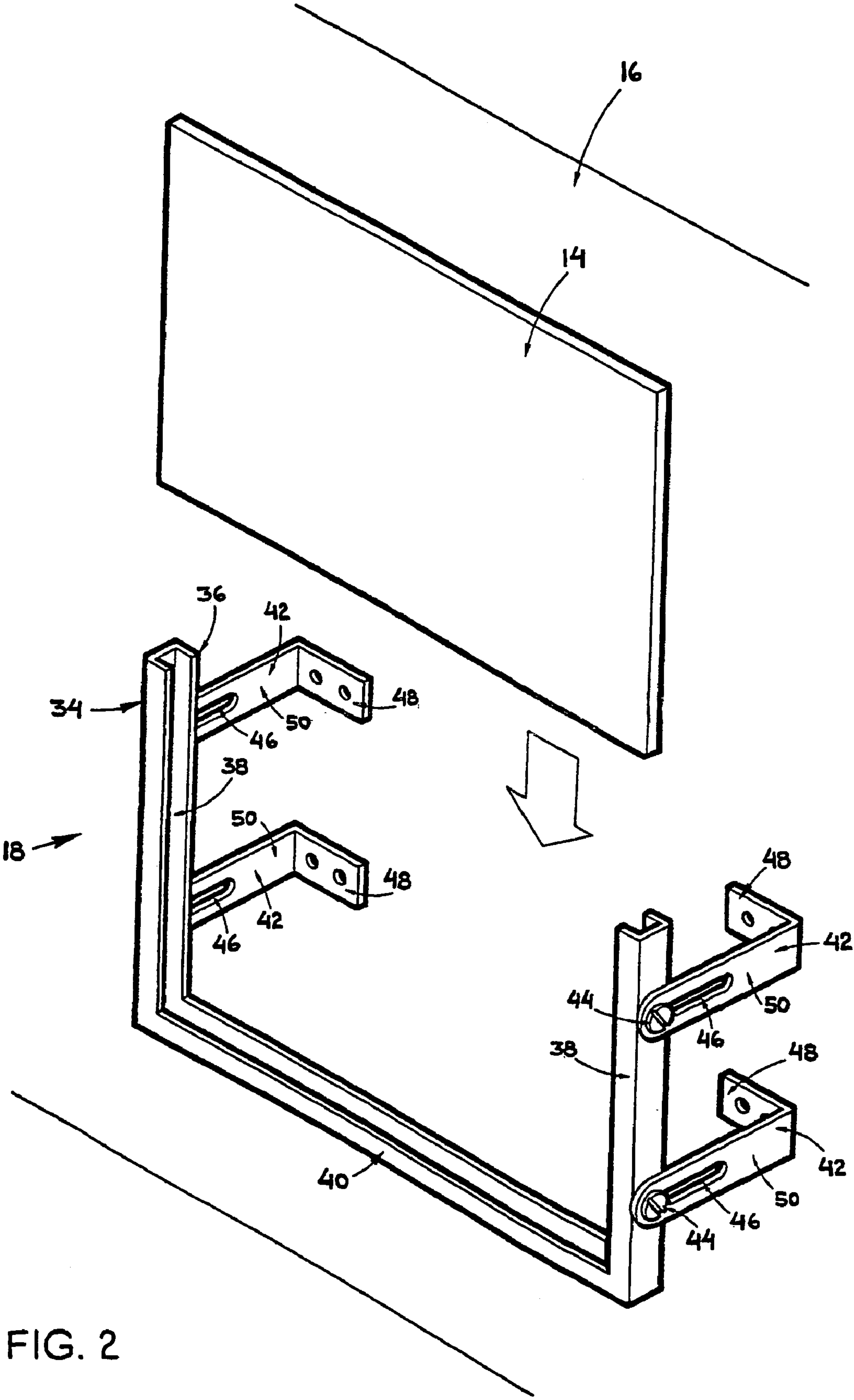
FIG. 2 is a perspective view of a panel mounting device.

As illustrated most particularly in FIG. 2, the image panels 14 are constructed of rigid materials so as to avoid movement on the passage of a vehicle due to the displacement of air. Image mounts 18 affix the image panels 14 to the wall 16 of the vehicle's pathway. The panel holder 34 includes a U-shaped frame 36 with upright arms 38 and a base 40 configured as channels to receive the side and bottom edges of an image panel. Each of the arms 38 is connected to two angle brackets 42 by fasteners 44 fixed to the arms and slots 46 in the brackets. Tightening the fasteners fixes the position of the arms along the slots. The angle brackets have base flanges 48 mounted on the wall, so that the flanges 50 in which the slots are formed project forwardly from the wall. Thus, the image panels may be each positioned vertically at a generally uniform distance from the train, regardless of the contour of the supporting wall. Of course minor variations may exist due to serious defects in the wall or general conditions.

Illumination of each image panel is provided through the strobe lights 20 which are attached to the wall and located immediately above the image mounts 32. The orientation of each light is preferably adjustable, using a rotating light head and "barn door" flaps. In order to reduce or practically eliminate the effect of glare from other light sources on the inside windows of a vehicle, the intensity of strobe illumination should be such that 75 percent of illumination perceived by an observer on passing through the region of the image panels derives from the external strobe lighting and the balance from sources within the vehicle. A further option is to reduce the internal lighting of the vehicle on entering into a vicinity of the image panels.

Each set of lights is preferably connected to the next set by interlocking receptacles. This produces modularity, resulting in ease of extension and maintenance.

Figure 6:
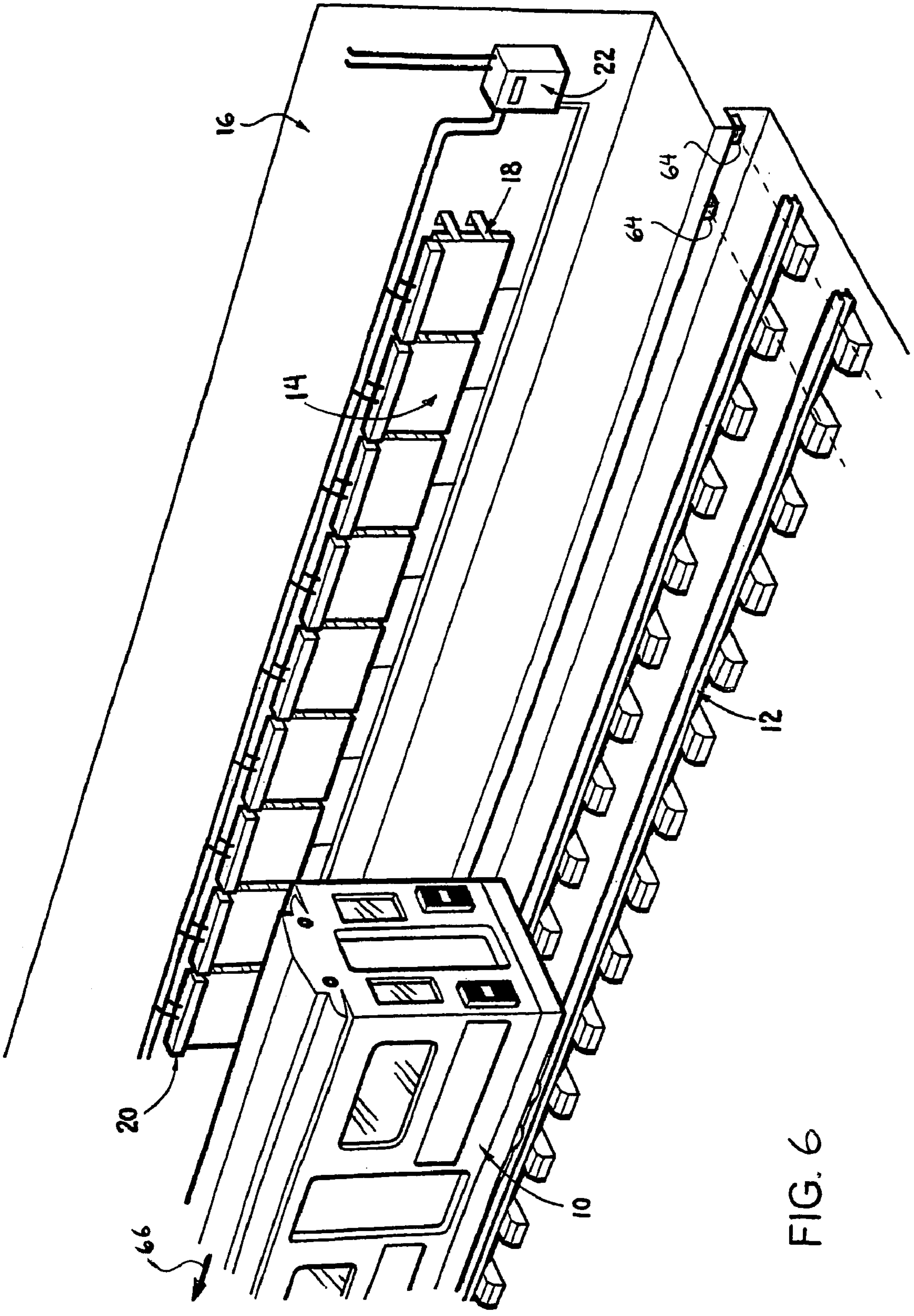
FIG. 6 is a perspective view of a second embodiment of an installation of a system according to the present invention.
Figure 8:
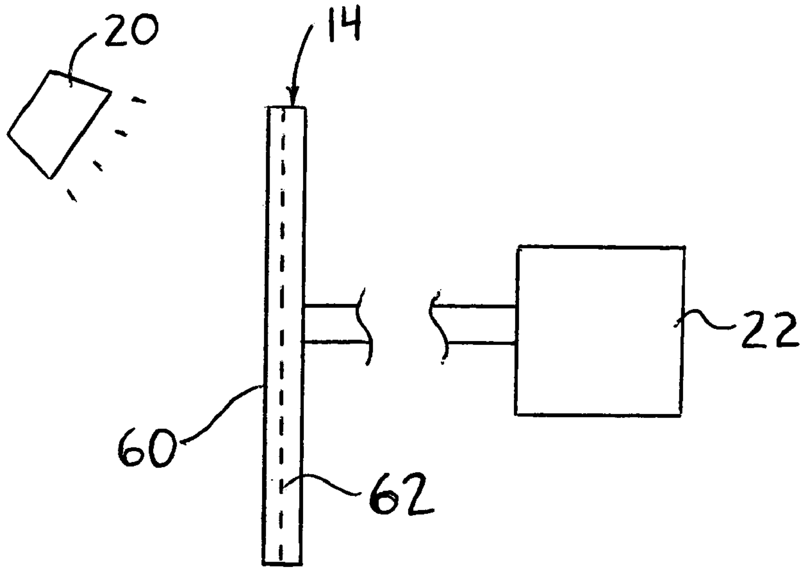
FIG. 8 is a schematic side elevational view of the panel according to the second embodiment.
Figure 7:
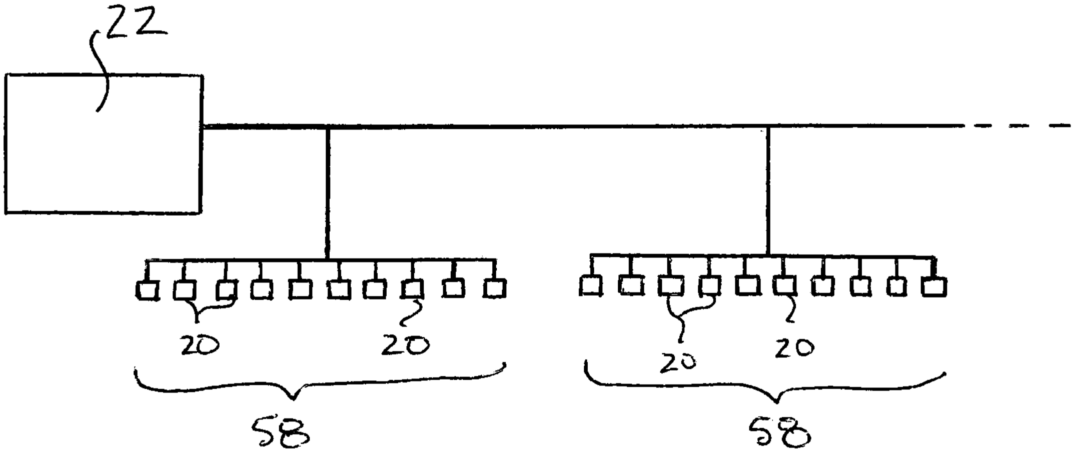
FIG. 7 is a schematic representation of the controller connections to the illumination system.

Turning now to the embodiment of FIGS. 6 through 8, a plurality of the panels 14 are similarly mounted side by side along a fixed wall 16 of a subway tunnel. As in the previous embodiment, an individual light 20 is provided in association with each panel and is directed at the panel for substantially only illuminating the respective panel.

The controller 22 in this instance includes a speed monitor to monitor the speed of the vehicle using a pair of sensors 64. Each sensor 64 is statically mounted adjacent the path of the vehicle to emit an infra-red beam to an opposing receiver, wherein the beams cross the path of the vehicle. The sensors are capable of detecting when the respective beam is broken and interrupted by the train passing therethrough so that the controller can determined the speed of the train based on the amount of elapsed time it takes for the train to break the second beam once the first beam has been broken. For effective operation the sensors 64 are mounted at spaced apart positions along the path of the vehicle ahead of the panels on the wall when the vehicle is traveling in direction 66 as shown in FIG. 6. The sensors 64 may also be used as the trigger for indicating when the train is approaching and when the simultaneous cycling of the viewability of the images should begin. Once the beam is broken, a timer determines the length of operation of the image cycling and illumination as described above.

Similarly to the previous embodiment, the controller according to the second embodiment uses the speed to determine the panel size and the viewing rate of the images using the relationship: $V \leqq (W_p+W_i)R$. Panel size is selected to ensure the viewing rate R of the images and is $\geqq 24$. To maintain the largest possible image size, the viewing rate should be kept as close to 24 as possible.

As shown schematically in FIG. 7, the images and associated lighting may be divided into banks 58, each comprising ten images and lights. The controller 22 is then coupled to the banks 58 by addressable digital relays which are associated with the banks 58 respectively. The digital relays thus permit the controller to operate activation and deactivation of the banks independently of one another in a stepped manner by sequentially turning on or turning off the banks at any programmed time in the vehicle's transit.

With reference to FIG. 8, each of the panels 14 according to the second embodiment has a viewable surface 60 on a flat front face thereof which is generally rectangular in shape and substantially spans the full dimensions of the panel 14. The viewable surface 60 is formed of millions of charged micro particles suspended in a first layer overlapping a control layer 62 which spans the full area of the panel underneath the viewable surface.

The particular configuration of the particles is similar to what is described in U.S. Pat. No. 6,333,754 to Fuji Xerox Company Limited, or in an alternate configuration, the viewable surface 60 may be configured in the manner described in various US patents owned by E Ink Corporation of Cambridge, Mass. All patents referred to are incorporated herein by reference.

The control layer permits individual charges applied to the micro particles to be varied for varying the orientation of the particles and thus effectively varying the image being displayed at the viewable surface 60.

In a first mode of operation of the system according to FIGS. 7 and 8, the viewing rate R is selected as a rate at which the images being displayed are themselves cycled on the viewable surface. The charges on the control layer 62 are cycled rapidly at a fixed frequency viewing rate greater or equal to the required 24 Hz according to the relationship $V \leqq (W_p+W_i)R$ for smoothly viewing the images by passengers of the vehicle.

Cycling of the image being displayed occurs by controlling the charges on the control layer 62 to be cycled between an active state in which a selected static image is displayed and an inactive state in which a blank image is displayed. The blank image is either black or darker than the static image to permit the light source 20 to remain steadily illuminated. An intense light source capable of steady illumination, such as light emitting diodes, is advantageous in this application. The light sources 20 are required as the viewable surface 60 only reflects light and does not emit any light itself. The lights should remain steadily illuminated while the images are cycled on the viewable surfaces of the panels.

As described above, the digital relays permit the controller to operate activation and deactivation of the banks of images to be cycled on the panels independently of one another in a stepped manner by sequentially turning on or turning off the banks at any programmed time in the vehicle's transit. When a bank is turned on, the panels are illuminated and the images being displayed are cycled between their active and inactive states simultaneously with any other banks which are also turned on. Alternatively, when a bank is turned off, the illumination is deactivated and the viewable surfaces may be in the inactive state displaying a blank image.

Plural different active states maybe used each corresponding to a different image being displayed. To display one particular image, one of the active states/static images is selected for cycling intermittently with the blank image of the inactive state. The controller 22 may then be programmed to periodically change the image being cycled or otherwise displayed. This configuration is particularly advantageous when advertising a particular series of images to be cycled for a set duration after which time a new set of images is displayed on the panels respectively for being cycled intermittently with blank images. The controller 22 is arranged for simultaneously cycling all of the images on the panels 14 between respective active and inactive states so that no complex control of the lighting is required.

In a further mode of operation of the system according to FIG. 7 and 8, the viewable surfaces 60 may be programmed to display a prescribed set of images in a steady manner while the lights are cycled in the manner described in the first embodiment so that the rate depends upon the speed of the vehicle. The speed is either assumed constant or measured by the speed monitor as described above. The viewable surface 60 permits the images to be instantly changed to a new set of images which are again steadily displayed. The addressable digital relays of the banks 58 in this instance operate the illumination. When a bank is turned on, the cycling of the illumination for viewing the images is cycled simultaneously with any other banks which are also turned on. When a bank is turned off, the illumination is deactivated for that bank.

In further embodiments, any viewable surface may be used on the panels 14 which is formed of a material that itself can be cycled between a static image and a blank image at a rate greater than 24 cycles per second to eliminate the need for cycling the illumination system. Though currently cost prohibitive, a liquid crystal display for example could be used for cycling an image, in which the illumination system is incorporated into the panel itself.

It will be appreciated that the description above relates to the preferred embodiments by way of example only. Many possible variations on the apparatus will be evident to those knowledgeable in the field, and such variations are intended to be within the scope of the invention as described and claimed, whether or not expressly described. Examples of different variations to the features noted above are described in the following:

(1) Printed posters may be used with flashing strobelights having a flash rate derived from the mains frequency.

(2) Printed posters may also be used with strobelights operated at a flash rate manually set to a constant train speed and synchronized from a master firing source.

(3) In a further variation, printed posters may be illuminated by synchronously flashing strobelights flashing at a rate automatically set to an approaching train speed by a speed monitor calculating elapsed time between interruption of two cross track IR beams.

(4) In addition to the features of variation (3), the lights may be operable in a series of banks of 10-lights by the use of addressable digital relays in the system junction boxes to permit stepped activation or deactivation of the illumination system in quantums of 10-posters at any programmed time in the vehicle's transit.

(5) Panels having a display surface programmable to display different images may themselves be cycled at the frequency set by the train velocity sensor while the illumination system provides steady state, zero flash rate, intense light to the panels. The images displayed on the entire series of panels can be changed by inputting a new graphics program to change all animated posters. This variation can make use of banks of 10-posters with addressable digital relays to permit a stepped activation and deactivation of the image cycling on the panels in quantums of 10-posters, at any programmed time in the vehicle's transit.

(6) Panels having a display surface programmable to display different images themselves may also be operated in a steady non-flashing state. Lighting in this instance must be operated at a flash rate whose frequency has been set by the train speed sensor and which is operable in banks of 10 posters to permit stepped activation and deactivation of the illumination system. Data displayed on entire series of posters can still be changed by inputting a new graphics program to change all animated posters in the sequence.

While the panels of variations (5) and (6) allow changes to the images being displayed throughout the day by keystroke or programming using either flashing illumination with a steady poster image or static illumination with a flashing poster image; in both cases the rate of the flashing must be attunable to the train speed to optimize the quality of animation seen from the transiting vehicle.

As one example, the vehicle used in the foregoing description is a subway train travelling in an underground subway tunnel. However, this invention is adaptable to be used for outdoor rail systems, monorails, elevators, or any form of transportation where images may be viewed from a moving position and the prevailing lighting conditions are appropriate or are appropriately adjustable.

The preceding description has described the viewing of a motion picture through the windows on one side of a train. It is to be understood that images may be provided on both sides where appropriate conditions exist. Where used, the images on opposite sides need not be of the same motion picture.

The invention claimed is:

1. A moving picture system for viewing from a vehicle traveling along a fixed path, the system comprising:

a plurality of display panels, each having a viewable surface which is arranged to be cyclable between an active state in which the viewable surface comprises a static image being displayed and an inactive state in which the viewable surface comprises a blank image being displayed, the viewable surface being arranged to be cyclable between the active and inactive states at a fixed frequency viewing rate which is greater than 24 cycles per second and dependent upon speed of the vehicle;

image mounts mounting the display panels along one side of the fixed path;

an illumination system arranged to provide steady state illumination to the display panels for viewing the static images; and a single trigger arranged to be responsive to the approach of the vehicle to cause the viewable surfaces of all of the display panels to be simultaneously cycled between their respective active and inactive states.

2. A system according to claim 1 wherein there is provided a speed sensing device fixed in relation to the fixed path of the vehicle for measuring speed of the vehicle.

3. A system according to claim 1 wherein the display panels are divided into consecutive banks, each bank comprising a plurality of the display panels, in which the viewability of one bank can be activated or deactivated independently of the remaining banks by the image cycling system.

4. A system according to claim 3 wherein the image cycling system is arranged for controlling viewability of the display panels in a stepped manner by sequentially activating or sequentially deactivating the banks.

5. A system according to claim 1 wherein the illumination system comprises light emitting diodes.

6. The system according to claim 1 wherein each image has a width $W_p$ and is spaced from the adjacent images by a spacing $W_i$ and the dimensions $W_p$ and $W_i$ are related to a speed of the vehicle V by $$(W_p+W_i) \geqq \tilde{V}P$$

where R is the fixed frequency viewing rate and is greater than or equal to 17 images per second.

7. A system according to claim 1 wherein the illumination system provides steady state illumination to the display panels at a zero flash rate.

8. A system according to claim 1 wherein the viewable surface comprises a non light emitting surface.

9. A system according to claim 1 wherein the blank image displayed by each panel in the inactive state is darker than the respective static image displayed in the active state.

10. A system according to claim 1 wherein each display panel is cyclable between the inactive state and a selected one of plural different active states, each corresponding to a different static image being displayed.

11. A system according to claim 1 wherein the viewable surface comprises a layer of charged particles supported on a control layer in which the charged particles vary in orientation depending upon various electrical charges applied to the control layer to cycle the image between the static image and the blank image.

12. A system according to claim 1 wherein each image each image has an image height $H_p$ and is spaced from the vehicle by a distance D and wherein the ratios $H_p$:D and $W_p$:D are substantially constant from image to image.

13. A moving picture system for viewing from a vehicle traveling along a fixed path, the system comprising:

a plurality of display panels, each having a viewable surface;

an illumination system arranged to provide steady state, non-flashing illumination to the display panels to illuminate the viewable surfaces for viewing;

the viewable surface of each display panel being arranged to be cyclable between an active state in which the viewable surface comprises a static image illuminated by the illumination system and an inactive state in which the viewable surface comprises a blank image illuminated by the illumination system;

the viewable surface being arranged to be cyclable between the active state and the inactive state at a fixed frequency viewing rate which is greater than 24 cycles per second and dependent upon speed of the vehicle;

image mounts arranged to mount the display panels along one side of the fixed path; and a single trigger arranged to be responsive to the approach of the vehicle to cause the viewable surfaces of all of the display panels to be simultaneously cycled between their respective active and inactive states while illuminated by the steady state, non-flashing illumination.

14. A system according to claim 13 wherein there is provided a speed sensing device fixed in relation to the fixed path of the vehicle for measuring speed of the vehicle and for triggering the image cycling system.

15. A system according to claim 13 wherein there is provided a speed sensing device fixed in relation to the fixed path of the vehicle for measuring speed of the vehicle.

16. A system according to claim 13 wherein the display panels are divided into consecutive banks, each bank comprising a plurality of the display panels, in which the viewability of one bank can be activated or deactivated independently of the remaining banks by the image cycling system.

17. A system according to claim 16 wherein the image cycling system is arranged for controlling viewability of the display panels in a stepped manner by sequentially activating or sequentially deactivating the banks.

18. A system according to claim 13 wherein the viewable surface comprises of each panel comprises a non light emitting surface in which the blank image displayed in the inactive state is darker than the static image displayed in the active state.

19. A system according to claim 13 wherein each display panel is cyclable between the inactive state and a selected one of plural different active states, each corresponding to a different static image being displayed.

20. A system according to claim 13 wherein the viewable surface comprises a layer of charged particles supported on a control layer in which the charged particles vary in orientation depending upon various electrical charges applied to the control layer to cycle the image between the static image and the blank image.

* * * * *